United States Patent
Ishikawa et al.

(10) Patent No.: US 12,025,024 B2
(45) Date of Patent: Jul. 2, 2024

(54) TURBINE WHEEL, TURBINE, AND TURBOCHARGER

(71) Applicant: MITSUBISHI HEAVY INDUSTRIES ENGINE & TURBOCHARGER, LTD., Sagamihara (JP)

(72) Inventors: Yoshihiro Ishikawa, Tokyo (JP); Toru Hoshi, Tokyo (JP); Nobuhito Oka, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/013,435

(22) PCT Filed: Aug. 24, 2021

(86) PCT No.: PCT/JP2021/030932
§ 371 (c)(1),
(2) Date: Dec. 28, 2022

(87) PCT Pub. No.: WO2022/054561
PCT Pub. Date: Mar. 17, 2022

(65) Prior Publication Data
US 2023/0287795 A1  Sep. 14, 2023

(30) Foreign Application Priority Data

Sep. 10, 2020  (JP) ................. 2020-152425

(51) Int. Cl.
*F01D 5/04* (2006.01)
*F04D 17/10* (2006.01)
*F04D 29/28* (2006.01)

(52) U.S. Cl.
CPC ............... *F01D 5/04* (2013.01); *F04D 17/10* (2013.01); *F04D 29/284* (2013.01)

(58) Field of Classification Search
CPC ............. F01D 5/04; F04D 17/10; F02B 39/00
See application file for complete search history.

(56) References Cited

U.S. PATENT DOCUMENTS

2004/0202539 A1* 10/2004 Blank ................. F04D 29/281
415/206
2009/0169371 A1  7/2009 Tsuchiya et al.
(Continued)

FOREIGN PATENT DOCUMENTS

EP    1 574 666 A1    9/2005
JP    6-49701 U       7/1994
(Continued)

OTHER PUBLICATIONS

International Preliminary Report on Patentability and Written Opinion of the International Searching Authority for International Application No. PCT/JP2021/030932, dated Mar. 23, 2023, with an English translation.
(Continued)

*Primary Examiner* — Courtney D Heinle
*Assistant Examiner* — Danielle M. Christensen
(74) *Attorney, Agent, or Firm* — Birch, Stewart, Kolasch & Birch, LLP

(57) ABSTRACT

A turbine wheel according to at least one embodiment is a turbine wheel connected to a rotational shaft and configured to rotate about an axis and includes: a hub having a hub surface oblique to the axis in a cross-section along the axis; and a plurality of blades disposed on the hub surface. The turbine wheel includes a plurality of passages each of which is formed between two adjacent blades of the plurality of blades, and a relationship of Aen/Aave>1.01 is satisfied, where Aen is an area of a throat portion of a throat enlarged
(Continued)

passage which is at least one of the plurality of passages, and Aave is an average area of throat portions of the plurality of passages.

8 Claims, 8 Drawing Sheets

(56) References Cited

U.S. PATENT DOCUMENTS

| | | |
|---|---|---|
| 2019/0085868 A1 | 3/2019 | Anand et al. |
| 2020/0232330 A1 | 7/2020 | Chuang et al. |
| 2021/0172320 A1 | 6/2021 | Chiba et al. |

FOREIGN PATENT DOCUMENTS

| | | |
|---|---|---|
| JP | 3272088 B2 | 4/2002 |
| JP | 2009-108791 A | 5/2009 |
| JP | 2018-123802 A | 8/2018 |
| WO | WO 2007/063768 A1 | 6/2007 |
| WO | WO 2020/110257 A1 | 6/2020 |

OTHER PUBLICATIONS

International Search Report and Written Opinion of the International Searching Authority for International Application No. PCT/JP2021/030932, dated Oct. 26, 2021.

* cited by examiner

TURBINE WHEEL, TURBINE, AND TURBOCHARGER

TECHNICAL FIELD

The present disclosure relates to a turbine wheel, a turbine, and a turbocharger. The present application claims priority based on Japanese Patent Application No. 2020-152425 filed on Sep. 10, 2020, the entire content of which is incorporated herein by reference.

BACKGROUND ART

A centrifugal or mixed flow turbine has a scroll portion allowing exhaust gas to be drawn radially (see Patent Document 1, for example).

CITATION LIST

Patent Literature

Patent Document 1: JP2018-123802A

SUMMARY

Problems to be Solved

When a scroll portion is provided, a tongue portion has to be provided due to its structure. Therefore, a boundary layer may develop on the surface of the tongue portion during flow of exhaust gas, and a wake (low-speed region) may occur. This causes exhaust gas with low velocity to flow into the turbine, resulting in a decrease in turbine efficiency.

In view of the above, an object of at least one embodiment of the present disclosure is to suppress a decrease in turbine efficiency.

Solution to the Problems (1) A turbine wheel according to at least one embodiment of the present disclosure is a turbine wheel connected to a rotational shaft and configured to rotate about an axis, comprising: a hub having a hub surface oblique to the axis in a cross-section along the axis; and a plurality of blades disposed on the hub surface. The turbine wheel includes a plurality of passages each of which is formed between two adjacent blades of the plurality of blades, and a relationship of Aen/Aave>1.01 is satisfied, where Aen is an area of a throat portion of a throat enlarged passage which is at least one of the plurality of passages, and Aave is an average area of throat portions of the plurality of passages.

(2) A turbine according to at least one embodiment of the present disclosure is provided with the turbine wheel having the above configuration (1).

(3) A turbocharger according to at least one embodiment of the present disclosure is provided with the turbine having the above configuration (2).

Advantageous Effects

According to at least one embodiment of the present invention, it is possible to suppress a decrease in turbine efficiency.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration of Turbocharger 1)

Figure 1:
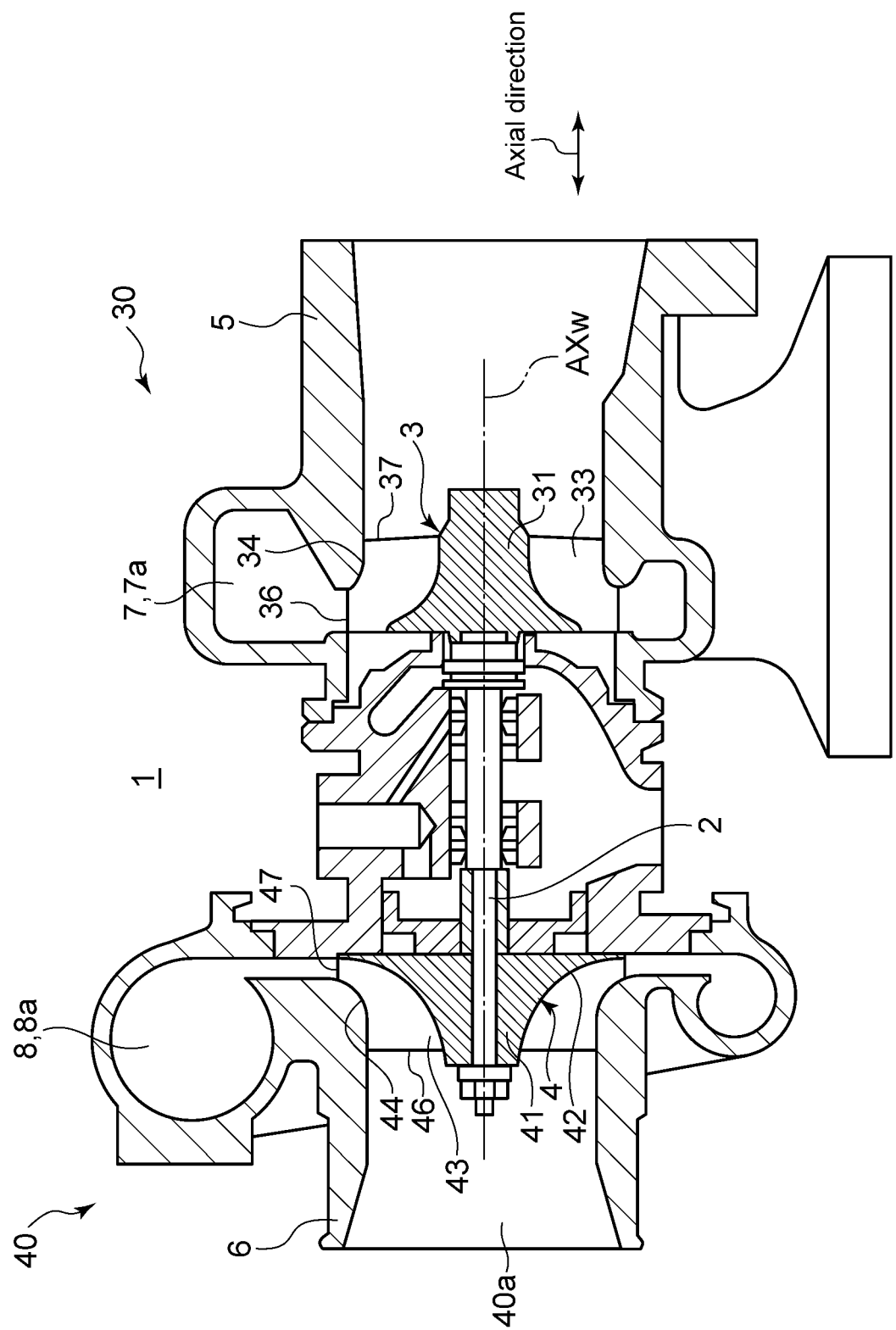
FIG. 1 is a cross-sectional view showing an example of a turbocharger according to some embodiments.

FIG. 1 is a cross-sectional view showing an example of a turbocharger 1 according to some embodiments.

The turbocharger 1 according to some embodiments is an exhaust turbocharger for supercharging air to an engine mounted on a vehicle such as an automobile.

The turbocharger 1 includes a turbine wheel 3 and a compressor wheel 4 coupled to each other with a rotor shaft 2 as a rotational shaft, a casing (turbine housing) 5 for accommodating the turbine wheel 3 rotatably, and a casing (compressor housing) 6 for accommodating the compressor wheel 4 rotatably. The turbine housing 5 includes a scroll portion 7 internally having a scroll passage 7a. The compressor housing 6 includes a scroll portion 8 internally having a scroll passage 8a.

A turbine 30 according to some embodiments is provided with the turbine wheel 3 and the casing 5. A compressor 40 according to some embodiments is provided with the compressor wheel 4 and the casing 6.

(Turbine Wheel 3)

Figure 2:
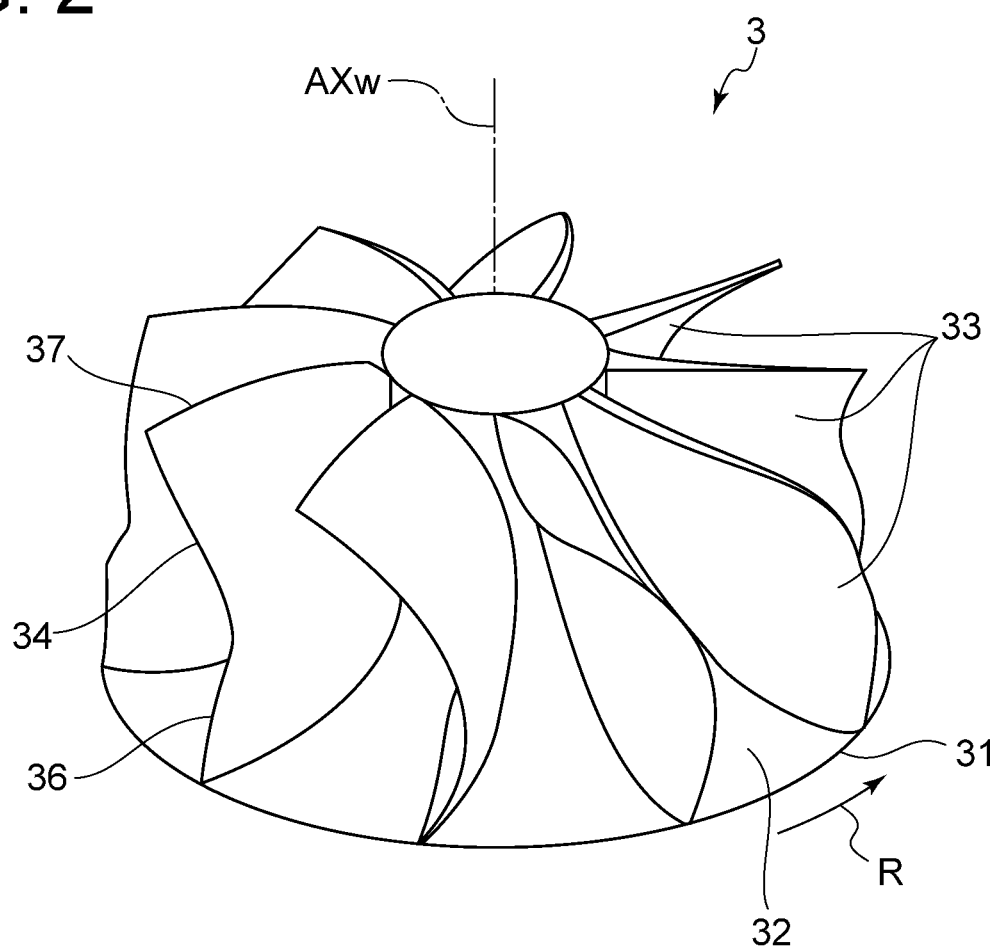
FIG. 2 is a perspective view showing the appearance of a turbine wheel according to some embodiments.

FIG. 2 is a perspective view showing the appearance of the turbine wheel 3 according to some embodiments.

The turbine wheel 3 according to some embodiments is an impeller coupled to the rotor shaft (rotational shaft) 2 and rotated about a rotational axis AXw. The turbine wheel 3 according to some embodiments includes a hub 31 having a hub surface 32 oblique to the rotational axis AXw in a cross-section along the rotational axis AXw, and a plurality of blades (rotor blades) 33 disposed on the hub surface 32. The turbine wheel 3 shown in FIGS. 1 and 2 is a radial turbine, but may be a mixed flow turbine. In FIG. 2, the arrow R indicates a rotational direction of the turbine wheel 3. The blades 33 are arranged at intervals in the circumferential direction of the turbine wheel 3.

The turbine wheel 3 according to some embodiments has a throat portion 35 where the area of a passage formed between two circumferentially adjacent blades 33 is the smallest (see FIG. 5, which will be described later). In the turbine wheel 3 according to some embodiments, the throat portion 35 is formed, on the pressure side of each blade 33, in a region closer to the leading edge 36 than the trailing edge 37 of the blade.

Although illustration by the perspective view is omitted, the compressor wheel 4 according to some embodiments also have the same configuration as the turbine wheel 3 according to some embodiments. That is, the compressor wheel 4 according to some embodiments is an impeller coupled to the rotor shaft (rotational shaft) 2 and rotated about the rotational axis AXw. The compressor wheel 4 according to some embodiments includes a hub 41 having a hub surface 42 oblique to the rotational axis AXw in a cross-section along the rotational axis AXw, and a plurality of blades (rotor blades) 43 disposed on the hub surface 42. The blades 43 are arranged at intervals in the circumferential direction of the compressor wheel 4.

In the turbocharger 1 thus configured, exhaust gas serving as a working fluid flows from the leading edge 36 toward the trailing edge 37 of the turbine wheel 3. This rotates the turbine wheel 3, and in turn rotates the compressor wheel 4 of the compressor 40 coupled to the turbine wheel 3 via the rotor shaft 2. As a result, intake air from an inlet portion 40a of the compressor 40 is compressed by the compressor wheel 4 in the process of flowing from the leading edge 46 toward the trailing edge 47 of the compressor wheel 4.

(Effect of Wake Occurring in Tongue Portion 71)

Figure 3:
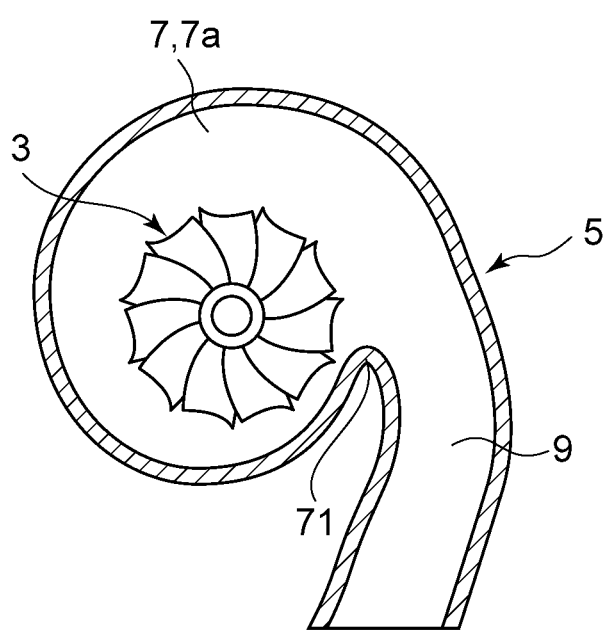
FIG. 3 is a view for describing a scroll portion of a turbine according to some embodiments.

FIG. 3 is a view for describing the scroll portion 7 of the turbine 30 according to some embodiments and is a schematic cross-sectional view in a cross-section perpendicular to the rotational axis AXw.

Figure 4A:
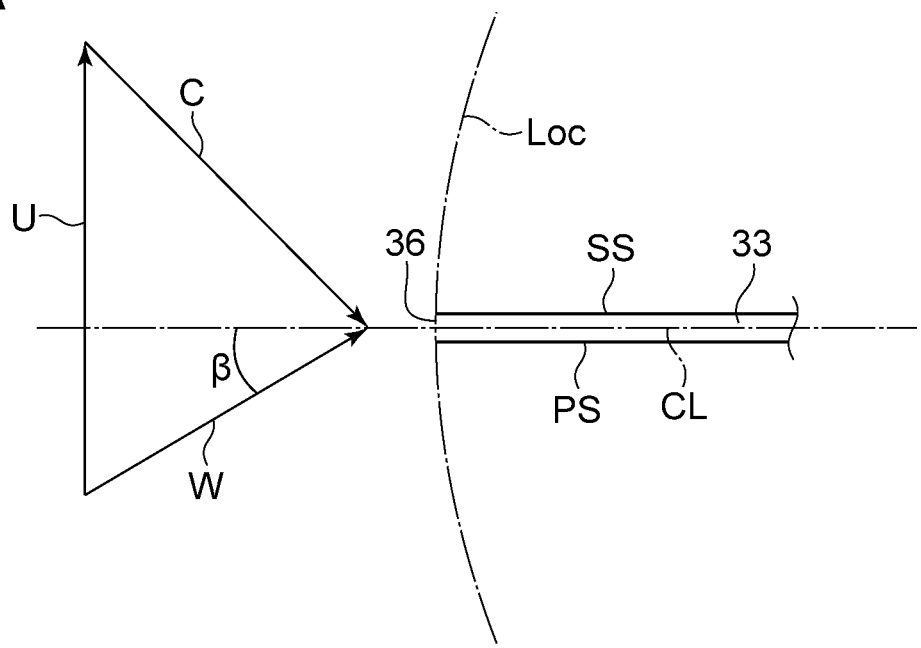
FIG. 4A is a view for describing a velocity triangle.

FIG. 4A is a view for describing a velocity triangle when exhaust gas inflow angle β at the leading edge 36 of the turbine wheel 3 is close to the ideal inflow angle.

Figure 4B:
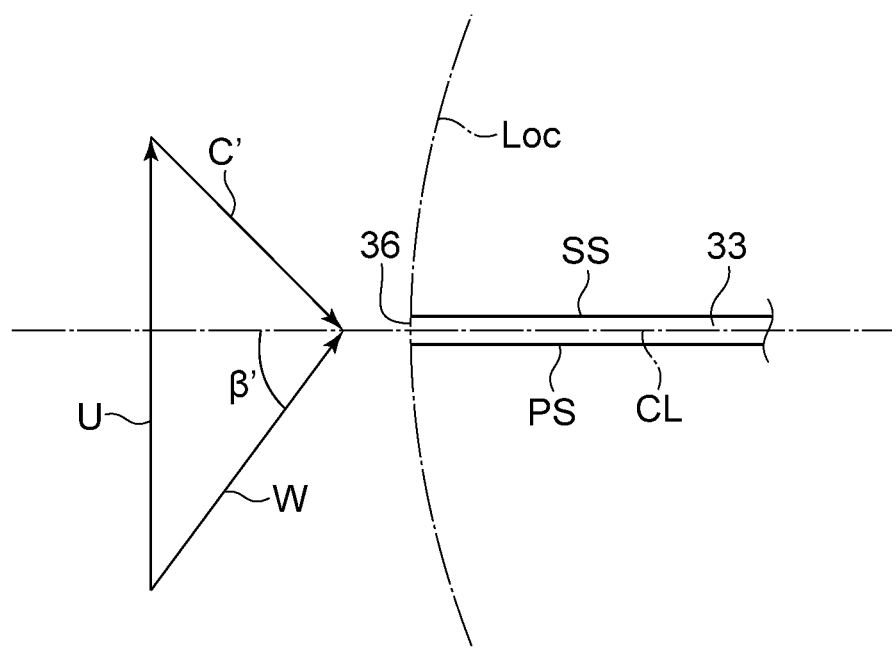
FIG. 4B is a view for describing a velocity triangle.

FIG. 4B is a view for describing a velocity triangle when exhaust gas inflow angle β at the leading edge 36 of the turbine wheel 3 deviates from the ideal inflow angle.

The velocity triangle shown in FIG. 4A is formed by the rotational velocity vector U of the turbine wheel 3, the absolute velocity vector C of exhaust gas, and the relative velocity vector W of exhaust gas when viewed from the turbine wheel 3.

The velocity triangle shown in FIG. 4B is formed by the rotational velocity vector U of the turbine wheel 3, the absolute velocity vector C' of exhaust gas, and the relative velocity vector W of exhaust gas when viewed from the turbine wheel 3.

In the velocity triangle shown in FIG. 4A, the exhaust gas inflow angle β at the leading edge 36 of the turbine wheel 3 is an angular difference between the extension direction of the camber line CL of the blade 33 and the relative velocity vector W at the leading edge 36.

In the velocity triangle shown in FIG. 4B, the exhaust gas inflow angle β' at the leading edge 36 of the turbine wheel 3 is an angular difference between the extension direction of the camber line CL of the blade 33 and the relative velocity vector W at the leading edge 36.

In FIGS. 4A and 4B, the lower surface of the blade 33 is a pressure surface PS, and the upper surface is a suction surface SS.

In FIGS. 4A and 4B, the arc of the dotted-dashed line is a locus Loc of the leading edge 36 which moves with rotation of the turbine wheel 3.

In some embodiments, the turbine housing 5 has a tongue portion 71 which separates the scroll passage 7a from a passage 9 disposed radially outward of the scroll passage 7a.

In a typical turbine 30, the closer the exhaust gas inflow angle β at the leading edge 36 of the turbine wheel 3 is to the ideal inflow angle, the better the aerodynamic performance of the turbine 30. However, when a boundary layer develops on the surface of the tongue portion 71 during flow of exhaust gas, and a wake (low-speed region) occurs, the absolute velocity of exhaust gas decreases, and the magnitude of the absolute velocity vector C of exhaust gas decreases. As a result, the exhaust gas inflow angle β at the leading edge 36 of the turbine wheel 3 deviates from the ideal inflow angle, resulting in a decrease in efficiency of the turbine 30.

Figure 5:
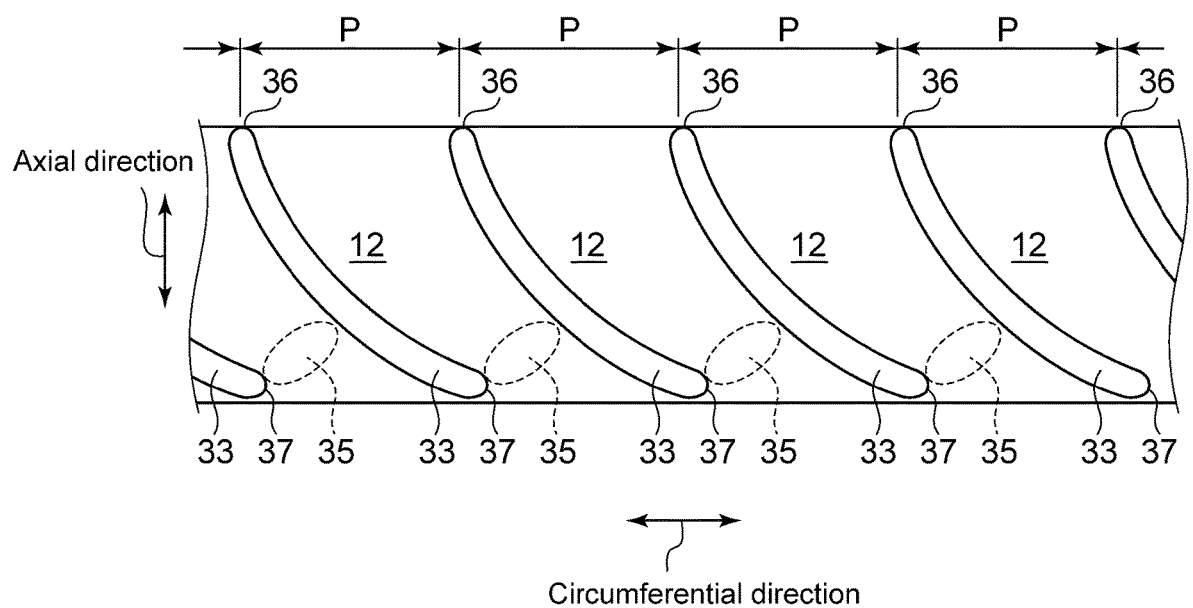
FIG. 5 is a schematic development of a turbine wheel according to some embodiments.
Figure 6:
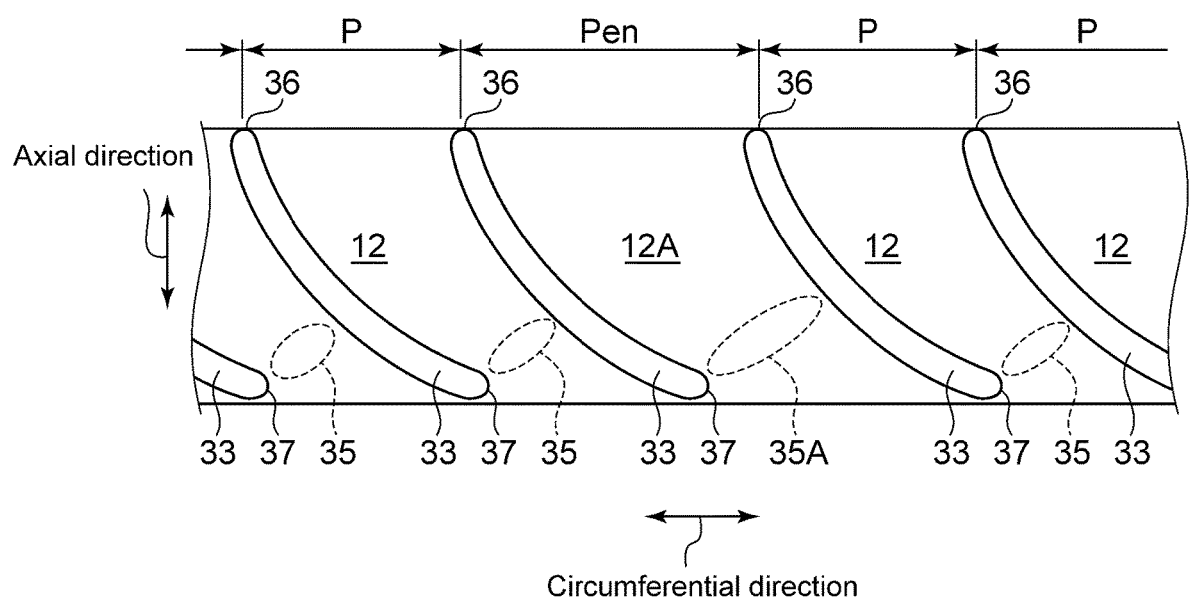
FIG. 6 is a schematic development of a turbine wheel according to some embodiments.

FIGS. 5 and 6 are each a schematic development of the turbine wheel 3 according to some embodiments. FIG. 5 shows a region where the blade pitch P between two adjacent blades 33 is constant. FIG. 6 is a development including a region where the blade pitch is partially enlarged.

As shown in FIGS. 5 and 6, a passage 12 for exhaust gas is formed between two circumferentially adjacent blades 33 of the turbine wheel 3. The turbine wheel 3 according to some embodiments includes a plurality of passages 12 each of which is formed between two adjacent blades 33. Each of the plurality of passages 12 has a throat portion 35, which is a portion having the smallest cross-sectional area (flow path area) of the passage 12 when viewed along the exhaust gas flow direction.

In FIGS. 5 and 6, an approximate position of the throat portion 35 is indicated by the dashed ellipse.

Generally, the flow rate of the turbine 30 depends on the area A of the throat portion 35 (flow path area in the throat portion 35), and it increases as the area A of the throat portion 35 increases. Therefore, in order to suppress a decrease in absolute velocity of exhaust gas due to the wake, it is conceivable to enlarge the area A of the throat portion 35 of some passages 12 and increase the amount of exhaust gas flowing through the passages 12.

In view of this, in the turbine wheel 3 according to some embodiments, the area Aen of the throat portion 35A of the throat enlarged passage 12A, which is at least one passage 12 of the plurality of passages 12, is intentionally larger than the average area Aave of the throat portions 35 of the plurality of passages 12. Specifically, in the turbine wheel 3 according to some embodiments, the area Aen of the throat portion 35A of the throat enlarged passage 12A is set to satisfy a relationship of Aen/Aave>1.01.

The average area Aave is an average value of the flow path areas in the throat portions 35, 35A of all the passages 12 including the throat enlarged passage 12A.

In this configuration, the area Aen of the throat portion 35A of the throat enlarged passage 12A exceeds 1.01 times the average area Aave of the throat portions 35 of the plurality of passages 12.

Generally, the manufacturing error in the area A of a throat portion 35 is less than 1% of the average area Aave of throat portions 35. Therefore, by intentionally increasing the area Aen of the throat portion 35A of the throat enlarged passage 12A to be larger than the average area Aave of the throat portions 35 of the plurality of passages 12, the area Aen exceeds 1.01 times the average area Aave.

With the turbine wheel 3 according to the above-described embodiments, exhaust gas easily flows through the throat enlarged passage 12A. Therefore, even if the above-described wake occurs, it is possible to suppress a decrease in absolute velocity of exhaust gas, and it is possible to prevent the exhaust gas inflow angle 3 at the leading edge 36 of the turbine wheel 3 from deviating from the ideal inflow angle. Thus, in the turbine 30 including the turbine wheel 3 according to some embodiments, it is possible to suppress a decrease in efficiency of the turbine 30.

(Case of Increasing Area Aen of Throat Portion 35A by Blade Pitch)

In the turbine wheel 3 according to some embodiments, a relationship of Pen>Pave may be satisfied, where Pen is a blade pitch of the two adjacent blades 33 that forms the throat enlarged passage 12A, and Pave is an average value of blade pitches P of the plurality of blades 33.

The average value Pave is an average value of all blade pitches P including the blade pitch Pen of the two adjacent blades 33 that forms the throat enlarged passage 12A.

Thus, by increasing the blade pitch Pen of the two adjacent blades 33 that forms the throat enlarged passage 12A to be larger than the average value Pave of the blade pitches P, the area Aen of the throat portion 35A of the throat enlarged passage 12A can be relatively easily made larger than the average area Aave.

(Case of Increasing Area Aen of Throat Portion 35A by Blade Thickness T)

Figure 7:
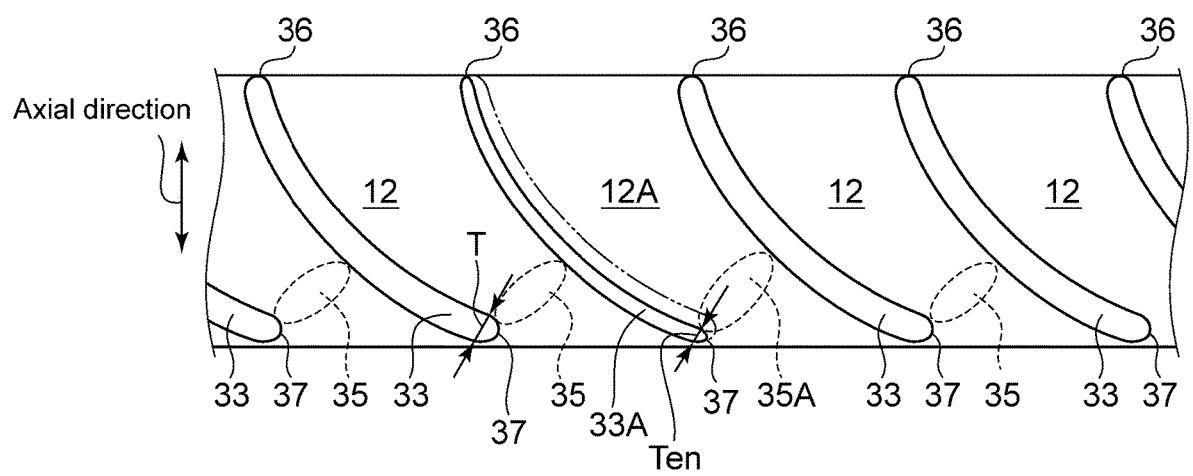
FIG. 7 is a schematic development of a turbine wheel according to another embodiment.

FIG. 7 is a schematic development of the turbine wheel 3 according to another embodiment.

In the turbine wheel 3 shown in FIG. 7, a relationship of Ten<Tave may be satisfied, where Ten is a blade thickness of at least one of the two adjacent blades 33 that forms the throat enlarged passage 12A in a region forming the throat portion 35A, and Tave is an average value of blade thicknesses T of the plurality of blades 33 in a region forming the throat portions 35.

The average area Tave is an average value of the blade thicknesses T of all the blades 33 including the two adjacent blades 33 that forms the throat enlarged passage 12A in a region forming the throat portions 35, 35A.

That is, in the turbine wheel 3 shown in FIG. 7, by decreasing the blade thickness Ten in a region forming the throat portion 35A of at least one blade 33A of the two adjacent blades 33 that forms the throat enlarged passage 12A to be smaller than the blade thickness T of the other blades 33, the area Aen of the throat portion 35A is made larger than the average area Aave.

Thus, the area Aen of the throat portion of the throat enlarged passage can be relatively easily made larger than the average area Aave.

As in the turbine wheel 3 shown in FIG. 7, the blade thickness of one blade 33A of the two adjacent blades 33 that forms the throat enlarged passage 12A may be reduced entirely from the leading edge 36 to the trailing edge 37, or the blade thickness may be reduced only in the region forming the throat portion 35A.

(Case of Increasing Area Aen of Throat Portion 35A by Changing Hub Surface Shape)

Figure 8:
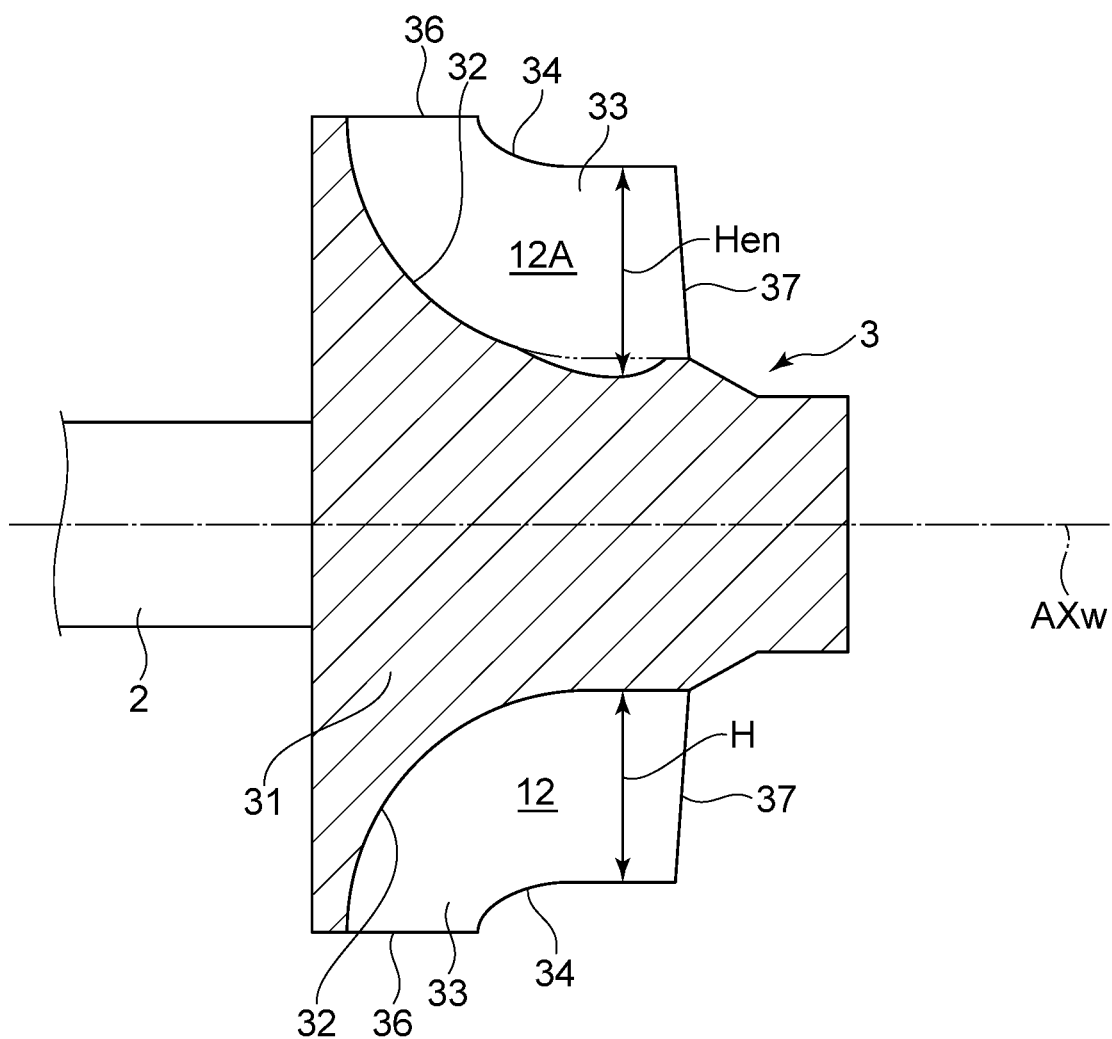
FIG. 8 is a schematic development of a turbine wheel according to still another embodiment.

FIG. 8 is a schematic development of the turbine wheel 3 according to still another embodiment.

In the turbine wheel 3 shown in FIG. 8, on the meridional plane of the turbine wheel 3, Hen is a span distance between the tip end 34 of the blade 33 and the hub surface 32 in the throat portion 35A of the throat enlarged passage 12A. On the meridional plane of the turbine wheel 3, Have is an average value of span distances H between the tip end 34 of each blade 33 and the hub surface 32 in the throat portions 35 of the plurality of passages 12. Then, a relationship of Hen>Have may be satisfied.

The average area Have is an average value of the span distances H between the tip end 34 of each blade 33 and the hub surface 32 in all the throat portions 35, 35A including the throat portion 35A of the throat enlarged passage 12A.

In the turbine wheel 3 shown in FIG. 8, the area A of the throat portion 35 can be changed by changing the span distance H between the tip end 34 of the blade 33 and the hub surface 32 in the throat portion 35. For example, in the turbine wheel 3 shown in FIG. 8, the hub surface 32 in the throat portion 35A of the throat enlarged passage 12A is recessed radially inward of the turbine wheel 3 with respect to the hub surface 32 in the throat portions 35 of the other passages 12. As a result, the span distance Hen in the throat portion 35A of the throat enlarged passage 12A is made larger than the average value Have of the span distances H, so that the area Aen of the throat portion 35A increases.

Thus, by increasing the span distance Hen between the tip end 34 and the hub surface 32 in the throat portion 35A of the throat enlarged passage 12A to be larger than the average value Have of the span distances H, the area Aen of the throat portion 35A of the throat enlarged passage 12A can be relatively easily made larger than the average area Aave.

(Arrangement Throat Enlarged Passage 12A)

In the turbine wheel 3 according to the above-described embodiments, the at least one throat enlarged passage 12A may include a plurality of throat enlarged passages 12A.

The preferred number of throat enlarged passages 12A depends, for example, on the specifications of the turbocharger 1 and an engine to be combined.

In the turbine wheel 3 according to the above-described embodiments, including a plurality of throat enlarged passages 12A is effective when providing more than one throat enlarged passage 12A instead of one is better to suppress a decrease in efficiency of the turbine 30.

In the turbine wheel 3 according to the above-described embodiments, the plurality of throat enlarged passages 12A may be discretely arranged.

Whether the throat enlarged passages 12A should be arranged continuously along the circumferential direction or discretely depends, for example, on the specifications of the turbocharger 1 and an engine to be combined.

In the turbine wheel 3 according to the above-described embodiments, discretely arranging the throat enlarged passages 12A is effective when discrete arrangement of throat enlarged passages 12A is better.

In the turbine wheel 3 according to the above-described embodiments, the plurality of throat enlarged passages 12A may be continuously arranged.

As described above, whether the throat enlarged passages 12A should be arranged continuously along the circumferential direction or discretely depends, for example, on the specifications of the turbocharger 1 and an engine to be combined.

In the turbine wheel 3 according to the above-described embodiments, continuously arranging the throat enlarged passages 12A is effective when continuous arrangement of throat enlarged passages 12A is better.

Since the turbine 30 according to the above-described embodiments is provided with the turbine wheel 3 according to the above-described embodiments, it is possible to suppress a decrease in efficiency of the turbine 30.

Further, since the turbocharger 1 according to the above-described embodiments is provided with the turbine 30 according to the above-described embodiments, it is possible to improve the performance of the turbocharger 1.

The present disclosure is not limited to the embodiments described above, but includes modifications to the embodiments described above, and embodiments composed of combinations of those embodiments.

The contents described in the above embodiments would be understood as follows, for instance.

(1) A turbine wheel 3 according to at least one embodiment of the present disclosure is a turbine wheel 3 connected to a rotational shaft (rotor shaft 2) and configured to rotate about an axis (rotational axis AXw), comprising: a hub 31 having a hub surface 32 oblique to the axis (rotational axis AXw) in a cross-section along the axis (rotational axis AXw); and a plurality of blades 33 disposed on the hub surface 32. The turbine wheel 3 includes a plurality of passages 12 each of which is formed between two adjacent blades 33, and a relationship of Aen/Aave>1.01 is satisfied, where Aen is an area of a throat portion 35A of a throat enlarged passage 12A which is at least one of the plurality of passages 12, and Aave is an average area of throat portions 35 of the plurality of passages 12.

In a typical turbine, the closer the exhaust gas inflow angle at the leading edge of the turbine wheel is to the ideal inflow angle, the better the aerodynamic performance of the turbine. However, when a boundary layer develops on the surface of the tongue portion during flow of exhaust gas, and a wake (low-speed region) occurs, the absolute velocity of exhaust gas decreases, and the exhaust gas inflow angle at the leading edge of the turbine wheel deviates from the ideal inflow angle, resulting in a decrease in efficiency of the turbine.

With the above configuration (1), exhaust gas easily flows through the throat enlarged passage 12A. Therefore, even if the above-described wake occurs, it is possible to suppress a decrease in absolute velocity of exhaust gas, and it is possible to prevent the exhaust gas inflow angle β at the leading edge 36 of the turbine wheel 3 from deviating from the ideal inflow angle. Thus, in the turbine 30 including the turbine wheel 3 with the above configuration (1), it is possible to suppress a decrease in efficiency of the turbine 30.

(2) In some embodiments, in the above configuration (1), a relationship of Pen>Pave may be satisfied, where Pen is a blade pitch of the two adjacent blades 33 that forms the throat enlarged passage 12A, and Pave is an average value of blade pitches P of the plurality of blades 33.

With the above configuration (2), by increasing the blade pitch Pen of the two adjacent blades 33 that forms the throat enlarged passage 12A to be larger than the average value Pave of the blade pitches P, the area Aen of the throat portion 35A of the throat enlarged passage 12A can be relatively easily made larger than the average area Aave.

(3) In some embodiments, in the above configuration (1) or (2), a relationship of Ten<Tave may be satisfied, where Ten is a blade thickness of at least one of the two adjacent blades 33 that forms the throat enlarged passage 12A in a region forming the throat portion 35A, and Tave is an average value of blade thicknesses T of the plurality of blades 33 in a region forming the throat portions 35.

With the above configuration (3), the area Aen of the throat portion 35A of the throat enlarged passage 12A can be relatively easily made larger than the average area Aave.

(4) In some embodiments, in any one of the above configurations (1) to (3), on the meridional plane of the turbine wheel 3, Hen is a span distance between the tip end 34 of the blade 33 and the hub surface 32 in the throat portion 35A of the throat enlarged passage 12A. On the meridional plane of the turbine wheel 3, Have is an average value of span distances between the tip end 34 of each blade 33 and the hub surface 32 in the throat portions 35 of the plurality of passages 12. Then, a relationship of Hen>Have may be satisfied.

With the above configuration (4), the area A of the throat portion 35 can be changed by changing the span distance H between the tip end 34 of the blade 33 and the hub surface 32 in the throat portion 35. Thus, by increasing the span distance Hen between the tip end 34 and the hub surface 32 in the throat portion 35A of the throat enlarged passage 12A to be larger than the average value Have of the span distances H, the area Aen of the throat portion 35A of the throat enlarged passage 12A can be relatively easily made larger than the average area Aave.

(5) In some embodiments, in any one of the above configurations (1) to (4), the at least one throat enlarged passage 12A may include a plurality of throat enlarged passages 12A.

The preferred number of throat enlarged passages 12A depends, for example, on the specifications of the turbocharger 1 and an engine to be combined.

The above configuration (5) is effective when providing more than one throat enlarged passage 12A instead of one is better to suppress a decrease in efficiency of the turbine 30.

(6) In some embodiments, in the above configuration (5), the plurality of throat enlarged passages 12A may be discretely arranged.

Whether the throat enlarged passages 12A should be arranged continuously along the circumferential direction or discretely depends, for example, on the specifications of the turbocharger 1 and an engine to be combined.

The above configuration (6) is effective when discrete arrangement of throat enlarged passages 12A is better.

(7) In some embodiments, in the above configuration (5), the plurality of throat enlarged passages 12A may be continuously arranged.

As described above, whether the throat enlarged passages 12A should be arranged continuously along the circumferential direction or discretely depends, for example, on the specifications of the turbocharger 1 and an engine to be combined.

The above configuration (7) is effective when continuous arrangement of throat enlarged passages 12A is better.

(8) A turbine 30 according to at least one embodiment of the present disclosure is provided with the turbine wheel 3 having any one of the above configurations (1) to (7).

With the above configuration (8), it is possible to suppress a decrease in efficiency of the turbine 30.

(9) A turbocharger 1 according to at least one embodiment of the present disclosure is provided with the turbine 30 having the above configuration (8).

With the above configuration (9), it is possible to improve the performance of the turbocharger 1.

REFERENCE SIGNS LIST

1 Turbocharger
2 Rotational shaft (Rotor shaft)
3 Turbine wheel
5 Casing (Turbine housing)
12 Passage
12A Throat enlarged passage
30 Turbine
31 Hub
32 Hub surface
33, 33A Blade (Rotor blade)
34 Tip end
35, 35A Throat portion
36 Leading edge
37 Trailing edge

The invention claimed is:

1. A turbine comprising a turbine wheel, the turbine wheel being connected to a rotational shaft and configured to rotate about an axis, the turbine wheel comprising:
   a hub having a hub surface oblique to the axis in a cross-section along the axis; and
   a plurality of blades disposed on the hub surface,
   wherein the turbine wheel includes a plurality of passages each of which is formed between two adjacent blades of the plurality of blades, and
   wherein a relationship of Aen/Aave>1.01 is satisfied,
   where Aen is an area of a throat portion of a throat enlarged passage which is at least one of the plurality of passages, and
   Aave is an average area of throat portions of the plurality of passages.

2. The turbine according to claim 1,
   wherein a relationship of Pen>Pave is satisfied,
   where Pen is a blade pitch of the two adjacent blades that forms the throat enlarged passage, and
   Pave is an average value of blade pitches of the plurality of blades.

3. The turbine according to claim 1,
   wherein a relationship of Ten<Tave is satisfied,
   where Ten is a blade thickness of at least one of the two adjacent blades that forms the throat enlarged passage in a region forming the throat portion, and
   Tave is an average value of blade thicknesses of the plurality of blades in a region forming the throat portions.

4. The turbine according to claim 1,
   wherein, on a meridional plane of the turbine wheel, a relationship of Hen>Have is satisfied,
   where Hen is a span distance between a tip end of each blade and the hub surface in the throat portion of the throat enlarged passage, and
   Have is an average value of span distances between a tip end of each blade and the hub surface in the throat portions of the plurality of passages.

5. The turbine according to claim 1,
   wherein the at least one throat enlarged passage includes a plurality of throat enlarged passages.

6. The turbine according to claim 5,
   wherein the plurality of throat enlarged passages are discretely arranged.

7. The turbine according to claim 5,
   wherein the plurality of throat enlarged passages are continuously arranged in a circumferential direction of the turbine.

8. A turbocharger, comprising the turbine according to claim 1.

* * * * *